United States Patent [19]
Soudijn et al.

[11] 3,914,238
[45] Oct. 21, 1975

[54] 4-ARYL-α-(1,4-BENZODIOXAN-2-YL)-4-HYDROXY-1-PIPERIDINEETHANOLS

[75] Inventors: Willem Soudijn, Turnhout; Ineke van Wijngaarden, Beerse, both of Belgium

[73] Assignee: Janssen Pharmaceutica, N.V., Beerse, Belgium

[22] Filed: Jan. 18, 1974

[21] Appl. No.: 434,477

[52] U.S. Cl............................ 260/293.58; 424/267
[51] Int. Cl.².................................. C07D 211/52
[58] Field of Search............................... 260/293.58

[56] References Cited
OTHER PUBLICATIONS
Howe et al., J. Med. Chem. 13 (2), 169–176 (1970).

*Primary Examiner*—G. Thomas Todd
*Attorney, Agent, or Firm*—Salvatore R. Conte

[57] ABSTRACT

The compounds, 4-aryl-α-(1,4-benzodioxan-2-yl)-4-hydroxy-1-piperidineethanols, useful as antihypertensive agents.

6 Claims, No Drawings

4-ARYL-α-(1,4-BENZODIOXAN-2-YL)-4-HYDROXY-1-PIPERIDINEETHANOLS

BACKGROUND OF THE INVENTION:

The prior art discloses certain 2-(1,4-benzodioxan-2-yl)-2-hydroxyethylamine derivatives, not having said 4-aryl-4-hydroxypiperidine group. Such compounds may be found in the following references:
J. Med. Chem., 13 (2), 169 (1970); and
JA 72.35435 — Derw. Week (1972), T 36, Pharm. p. 6.

DESCRIPTION OF THE INVENTION:

This invention relates to novel compounds, 4-aryl-α-(1,4-benzodioxan-2-yl)-4-hydroxy-1-piperidineethanols, which may be represented by the formula:

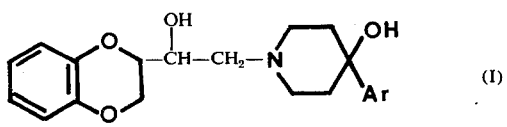

and the therapeutically active, non-toxic acid addition salts thereof, wherein Ar is a member selected from the group consisting of phenyl and substituted phenyl, the latter being a phenyl group having one or more substituents thereon, such as loweralkyl, loweralkyloxy, halo and trifluoromethyl. Preferably, the substituted phenyls are mono-, di- and tri-substituted.

As used herein, the term "loweralkyl" represents straight and branch chained alkyls having from 1 to 5 carbon atoms and the term "halo" refers to halogens of atomic weight less than 127, i.e., chloro, bromo, fluoro and iodo.

The subject compounds (I) are conveniently prepared by reacting a compound of formula (II), wherein X represents a reactive ester of the corresponding alcohol, such as, tosylate, mesylate, and halide, preferably the bromide, with the amine of formula (III). This condensation reaction is conveniently conducted in an inert organic solvent, such as, for example, an aromatic hydrocarbon, e.g., benzene, toluene, xylene and the like; a lower alkanol, e.g., methanol, ethanol, n-butanol, and the like; a ketone, e.g., 4-methyl-2-pentanone; an ether, e.g., dioxane, diethyl ether and the like; dimethylformamide (DMF); nitrobenzene; and the like. The addition of an appropriate base such as, for example, an alkali metal carbonate or bicarbonate, may be utilized to pick up the acid that is liberated during the course of the reaction. Elevated temperatures may be employed to enhance the rate of reaction.

uene, xylene and the like; a halogenated hydrocarbon, such as chloroform and methylene chloride; or a lower alkanol such as, for example, methanol, ethanol, isopropanol and the like, and preferably in a mixture of an aromatic hydrocarbon and a lower alkanol. The reaction may be promoted by the addition of alkali.

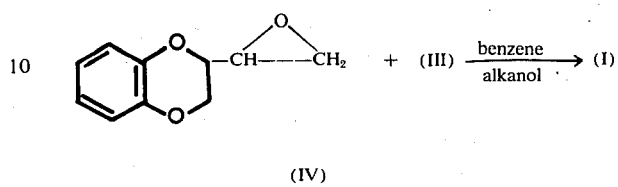

The compounds of formula (I) may also be prepared by the following reaction sequence. A compound of formula (III) is reacted with an appropriate benzodioxan-2-yl-halomethyl ketone, preferably the bromo derivative of formula (V) in an appropriate organic solvent, such as, for example, a lower alkanol in the presence of a convenient acid acceptor, e.g., an amine, such as diisopropylamine. The resulting ketone of formula (VI) is then reduced to the corresponding (I) by known methods such as, for example, with metal hydrides, such as, sodium borohydride, sodium aluminumhydride, borane, diborane and the like, or with a metal, preferably an alkali metal in an appropriate solvent such as known in the art, e.g., liquid ammonia, lower alkanol. The foregoing reactions are illustrated as follows:

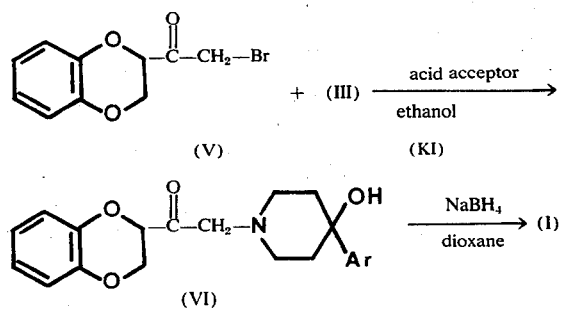

The benzodioxane derivatives of formulas (II), (IV) and (V) are known.

The 4-aryl-4-hydroxypiperidines of formula (III) which are for the most part also known may be obtained from methodologies available to one skilled in the art. Such compounds and methods for preparing same are described in U.S. Pat. Nos. 2,973,363, 3,575,990 and 3,714,159.

The subject compounds (I) may be converted to their therapeutically active non-toxic acid addition salt form by treatment with an appropriate acid, such as, for example, an inorganic acid, such as a hydrohalic acid, e.g., hydrochloric, hydrobromic and the like, and sulfonic acid, nitric acid, phosphoric acid and the like; or

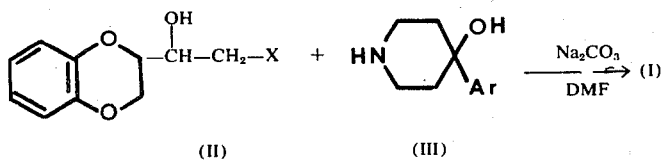

Alternatively the compounds of formula (I) are obtained by reacting (III) with 2-epoxyethyl-1,4-benzodioxane (IV) in a suitable organic solvent, such as an aromatic hydrocarbon, for example, benzene, tolan organic acid, such as, for example, acetic, propionic, glycolic, lactic, pyruvic, malonic, succinic, maleic, fumaric, malic, tartaric, citric, benzoic, cinnamic, mandelic, methanesulfonic, ethanesulfonic, benzenesulfonic, p-toluenesulfonic, cyclohexanesulfamic, salicylic, p-aminosalicylic and the like acids. Conversely, the salt form can be converted by treatment with alkali into the free base form.

Typical compounds of formula (I) that may be prepared according to the processes described herein are:

α-(1,4-benzodioxan-2-yl)-4-(p-ethoxyphenyl)-4-hydroxy-1-piperidineethanol;
α-(1,4-benzodioxan-2-yl)-4-(3,4-dimethylphenyl)-4-hydroxy-1-piperidineethanol;
α-(1,4-benzodioxan-2-yl)-4-(2,4-dichlorophenyl)-4-hydroxy-1-piperidineethanol;
α-(1,4-benzodioxan-2-yl)-4-(2,4,6-trichlorophenyl)-4-hydroxy-1-piperidineethanol;
α-(1,4-benzodioxan-2-yl)-4-(2,4,6-trimethylphenyl)-4-hydroxy-1-piperidineethanol; and
α-(1,4-benzodioxan-2-yl)-4-(2-chloro-4-methylphenyl)-4-hydroxy-1-piperidineethanol.

The compounds of formula (I), in base or acid addition salt form, have been found to possess marked blood pressure lowering activity, making them useful as anti-hypertensive agents. Blood pressure lowering activity was determined by the following procedure. Dogs were anesthetized with sodium pentobarbital (30 mg/kg i.p.). The arterial blood pressure was measured via an indwelling catheter, connected with an electronic pressure transducer. After the initial blood pressure was measured, the test compound was injected suboccipitally at dose levels of 2.5 and/or 10 μg/kg body weight. The results are illustrated in the following table. For each dose 2 to 6 dogs were used and the average of these experiments is presented.

It is understood that the compounds in the following table are not listed for the purpose of limiting the scope of the invention thereto but to exemplify the useful properties of all the compounds within the scope of formula (I).

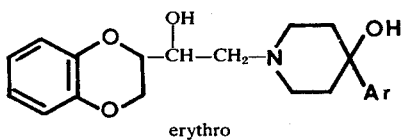

erythro

| Ar | blood pressure lowering effect at 2.5 μg per kg s.o.[r] | at 10 μg per kg s.o.[r] |
| --- | --- | --- |
| 4—Cl—$C_6H_4$ | − 42 mm. Hg | − 90 mm. Hg |
| 4—Br—$C_6H_4$ | − 10 mm. Hg | − 22 mm. Hg |
| 3—$CF_3$—$C_6H_4$ | − 30 mm. Hg | − 50 mm. Hg |
| 3—$CF_3$, 4—Cl—$C_6H_3$ | − 15 mm. Hg | − 21 mm. Hg |
| 4—$CH_3$—$C_6H_4$ | − 45 mm. Hg | − 40 mm. Hg |

[r] suboccipital.

It is obvious from formula (I) that the compounds of the present invention possess two asymmetric carbon atoms and consequently they may exist under four different stereochemical optical isomeric forms. Said isomers are naturally intended to be within the scope of the invention. The diastereoisomeric racemates denoted as erythro and threo forms, may be obtained separately, for example, by selective crystallization, by counter current distribution or by the unambiguous preparation of the desired form of (I) starting from the adequate form of (II). Said racemates may be further resolved into their optical enantiomers by methods known in the art, such as, by salt formation with optically active acids.

The following examples are intended to illustrate, but not to limit, the scope of the present invention. Unless otherwise stated, all parts are by weight.

EXAMPLE I

A mixture of 1.04 parts of erythro α-(bromomethyl)-1,4-benzodioxan-2-methanol, 0.765 parts of 4-(p-chlorophenyl)-4-piperidinol, 0.64 parts of sodium carbonate and 6 parts of dimethylformamide is stirred overnight at 100°C. The reaction mixture is cooled and diluted with 10 parts of water. The precipitated product is filtered off and crystallized from 2-propanol, yielding, after drying in vacuo at 50°C., erythro α-(1,4-benzodioxan-2-yl)-4-(p-chlorophenyl)-4-hydroxy-1-piperidineethanol; mp. 174.9°C.

EXAMPLE II

A mixture of 2.5 parts of erythro α-(bromomethyl)-1,4-benzodioxan-2-methanol, 2.56 parts of 4-(p-bromophenyl)-4-piperidinol, 1.6 parts of sodium carbonate and 15 parts of dimethylformamide is stirred overnight at 100°C. The reaction mixture is cooled and filtered over hyflo. Upon the addition of water, the product is precipitated. It is extracted with chloroform and water. The chloroform layer is dried, filtered and evaporated. The residue is triturated in boiling ether. The product is filtered off and crystallized from 2-propanol, yielding erythro α-(1,4-benzodioxan-2-yl)-4-(p-bromophenyl)-4-hydroxy-1-piperidineethanol; mp. 182.2°C.

EXAMPLE III

A mixture of 1.9 parts of erythro α-(bromomethyl)-1,4-benzodioxan-2-methanol, 1.84 parts of 4-(α,α,α-trifluoro-m-tolyl)-4-piperidinol, 1.19 parts of sodium carbonate and 11.5 parts of dimethylformamide is stirred for 16 hours at 110°C. The reaction mixture is cooled and filtered over hyflo. Upon the addition of water, the oily product is precipitated. It is extracted with chloroform and water. The chloroform layer is dried, filtered and evaporated. The residue is converted into the hydrochloride salt in ethyl acetate and 2-propanol, yielding erythro α-(1,4-benzodioxan-2-yl)-4-hydroxy-4-(α,α,α-trifluoro-m-tolyl)-1-piperidineethanol hydrochloride hydrate; mp. 153.6°C.

EXAMPLE IV

A mixture of 2.1 parts of erythro α-(bromomethyl)-1,4-benzodioxan-2-methanol, 1.52 parts of 4-p-tolyl-4-piperidinol, 1.27 parts of anhydrous sodium carbonate and 12 parts of dimethylformamide is stirred on a water-bath at 90°C for 16 hours. The reaction mixture is filtered over hyflo and the filtrate is diluted with water. The oily precipitate is extracted with chloroform. The extract is washed with water, dried, filtered and evaporated in vacuo. The residue is crystallized from 2-propanol. The product is filtered off and dried in vacuo at 70°C., yielding erythro α-(1,4-benzodioxan-2-yl)-4-hydroxy-4-p-tolyl-1-piperidineethanol; mp. 144.7°C.

EXAMPLE V

A mixture of 2.1 parts of erythro α-(bromomethyl)-1,4-benzodioxan-2-methanol, 2.13 parts of 4-(4-chloro-α,α,α-trifluoro-m-tolyl)-4-piperidinol, 1.27 parts of sodium carbonate, and 12 parts of dimethylformamide is stirred overnight at 110°C. The reaction mixture is cooled, filtered over hyflo and water is added to the filtrate. The separated oily product is extracted with chloroform. The extract is dried, filtered and evaporated. The residue is purified by column-chromatography over silicagel, using a mixture of chloroform and 10% of methanol as eluent. The pure fractions are collected and the eluent is evaporated. The residue is converted into the hydrochloride salt in 2-propanol. The crude oily salt solidifies on triturating in ether. The solid salt is filtered off and crystallized from ethyl acetate, yielding erythro α-(1,4-benzodioxan-2-yl)-4-(4-chloro-α,α,α-trifluoro-m-tolyl)-4-hydroxy-1-piperidineethanol hydrochloride; mp. 210.2°C.

We claim:

1. A compound selected from the group consisting of 4-aryl-α-(1,4-benzodioxan-2-yl)-4-hydroxy-1-piperidineethanols having the formula

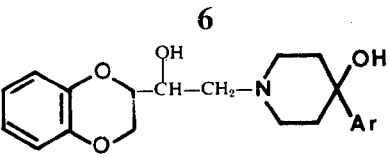

the stereochemical optical isomeric forms and the therapeutically active acid addition salts thereof, wherein Ar is a member selected from the group consisting of phenyl and substituted phenyl, the latter being phenyl substituted from 1 to 3 members selected from the group consisting of halo, loweralkyl, loweralkyloxy and trifluoromethyl.

2. Erythro α-(1,4-benzodioxan-2-yl)-4-(p-chlorophenyl)-4-hydroxy-1-piperidineethanol.

3. Erythro α-(1,4-benzodioxan-2-yl)-4-(p-bromophenyl)-4-hydroxy-1-piperidineethanol.

4. Erythro α-(1,4-benzodioxan-2-yl)-4-hydroxy-4-(α,α,α-trifluoro-m-tolyl)-1-piperidineethanol hydrochloride hydrate.

5. Erythro α-(1,4-benzodioxan-2-yl)-4-hydroxy-4-p-tolyl-1-piperidineethanol.

6. Erythro α-(1,4-benzodioxan-2-yl)-4-(4-chloro-α,α,α-trifluoro-m-tolyl)-4-hydroxy-1-piperidineethanol hydrochloride.

* * * * *